US008296032B2

(12) United States Patent
Wang et al.

(10) Patent No.: US 8,296,032 B2
(45) Date of Patent: Oct. 23, 2012

(54) HYBRID VEHICLE AND A METHOD OF CONTROL FOR IMPROVED POWER MANAGEMENT

(75) Inventors: Qing Wang, Dearborn, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 680 days.

(21) Appl. No.: 12/335,684

(22) Filed: Dec. 16, 2008

(65) Prior Publication Data

US 2010/0152936 A1   Jun. 17, 2010

(51) Int. Cl.
*B60T 7/12* (2006.01)
(52) U.S. Cl. ................ 701/84; 701/51; 701/54
(58) Field of Classification Search .............. 701/51, 701/54–55
See application file for complete search history.

(56) References Cited

U.S. PATENT DOCUMENTS

| | | | |
|---|---|---|---|
| 6,201,312 B1 | 3/2001 | Shioiri et al. | |
| 6,856,034 B2 | 2/2005 | Peters et al. | |
| 7,013,213 B2 | 3/2006 | McGee et al. | |
| 7,079,942 B2 | 7/2006 | McGee et al. | |
| 7,084,589 B1 | 8/2006 | Supina et al. | |
| 7,117,071 B2 | 10/2006 | Aoki et al. | |
| 7,203,578 B2 | 4/2007 | Kuang et al. | |
| 7,236,873 B2 | 6/2007 | Kuang et al. | |
| 7,267,191 B2 | 9/2007 | Xu et al. | |
| 7,268,442 B2 | 9/2007 | Syed et al. | |
| 7,273,439 B2 | 9/2007 | Kuang et al. | |
| 7,285,869 B2 | 10/2007 | Syed et al. | |
| 7,398,147 B2 | 7/2008 | Kozarekar et al. | |
| 7,638,980 B2 * | 12/2009 | Zettel et al. | 320/150 |
| 7,726,430 B2 * | 6/2010 | Yang | 180/242 |
| 7,739,016 B2 * | 6/2010 | Morris | 701/51 |
| 7,758,468 B2 * | 7/2010 | Vafidis et al. | 477/115 |
| 7,803,086 B2 * | 9/2010 | Tabata et al. | 477/3 |
| 7,891,450 B2 * | 2/2011 | Soliman et al. | 180/65.265 |
| 2006/0022469 A1 | 2/2006 | Syed et al. | |
| 2007/0029119 A1 | 2/2007 | Syed et al. | |
| 2008/0029318 A1 | 2/2008 | Proietty et al. | |
| 2008/0097684 A1 | 4/2008 | Syed et al. | |
| 2008/0243325 A1 | 10/2008 | Kozarekar et al. | |

OTHER PUBLICATIONS

Ultracapacitor-based energy management strategies for eCVT hybrid vehicles, Juergen Auer, Dr. John Miller, Maxwell Technologies SA, CH1728, Rossens Switzerland.
Modeling and Control of a Hybrid Electric Drivetrain for Optimum Fuel Economy, Performance and Driveability Dissertation, Presented in Partial Fulfillment of the Requirements for the Degree Doctor of Philosophy in the Graduate School of the Ohio State University, by Xi Wei, M.S., The Ohio State University 2004.
Energy Management in a Parallel Hybrid Electric Vehicle with a Continuously Variable Transmission, Paul Bowles, Scientific Research Laboratory, Ford Motor Company, Huei Peng, Department of Mechanical Engineering and Applied Mechanics, University of Michigan, Xianjie Zhang, Scientific Research Laboratory, Ford Motor Company, Proceedings of the American Control Conference, Chicago, Illinois Jun. 2000.

\* cited by examiner

*Primary Examiner* — Hussein A. Elchanti
(74) *Attorney, Agent, or Firm* — David B. Kelley; Brooks Kushman P.C.

(57) ABSTRACT

A hybrid vehicle and method of control. The method includes determining an engine torque command based on a request for vehicle acceleration or deceleration, a target power level of the secondary power source, and a current engine power command, determining an engine speed command based on the target power level of the secondary power source, a total engine power command, and vehicle speed, and operating the engine based on the engine torque and engine speed commands.

20 Claims, 3 Drawing Sheets

HYBRID VEHICLE AND A METHOD OF CONTROL FOR IMPROVED POWER MANAGEMENT

BACKGROUND OF THE INVENTION

1. Field of the Invention

The present invention relates to a hybrid vehicle and a method of control.

2. Background Art

A method of controlling power management in a hybrid vehicle is disclosed in U.S. Pat. No. 7,398,147, issued to the assignee of the present application.

SUMMARY OF THE INVENTION

In at least one embodiment, a method of controlling operation of a hybrid vehicle having an engine and a secondary power source is provided. The method includes determining an engine torque command, determining an engine speed command, and operating the engine based on the engine torque and engine speed commands. Determination of the engine torque command is based on a request for vehicle acceleration or deceleration, a target power level of the secondary power source, and a current engine power command. Determination of the engine speed command is based on the target power level of the secondary power source, a total engine power command, and vehicle speed.

In at least one embodiment, a method of controlling operation of a hybrid vehicle having an engine and a secondary power source is provided. The method includes determining a target power level of the secondary power source and a target engine torque command based on a request for vehicle acceleration or deceleration. A total engine power command is determined based on the request for vehicle acceleration or deceleration and the target power level of the secondary power source. A total amount of power desired from the secondary power source is determined based on the target power level of the secondary power source and the difference between the total engine power command and a current engine power command. The method also determines whether the total amount of power desired from the secondary power source is within operational limits. An engine torque command is determined by adjusting the target engine torque command when the total amount of power desired from the secondary power source is not within operational limits. An engine speed command is also determined and executed with the engine torque command to control operation of the engine.

In at least one embodiment, a hybrid vehicle is provided. The hybrid vehicle includes an electrical machine, primary and secondary power sources capable of supplying power to the electrical machine, and a control system. The control system includes at least one controller and is configured to determine a target power level of the secondary power source, a target torque command for the primary power source, and a total power command for the primary power source based at least on part on a driver input. A total amount of power desired from the secondary power source is determined based on the target power level of the secondary power source, the total power command for the primary power source, and a current power command for the primary power source. The target torque command for the primary power source is adjusted when the total amount of power desired from the secondary power source is not within operational limits. The target torque command is applied to control the torque provided by the primary power source.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
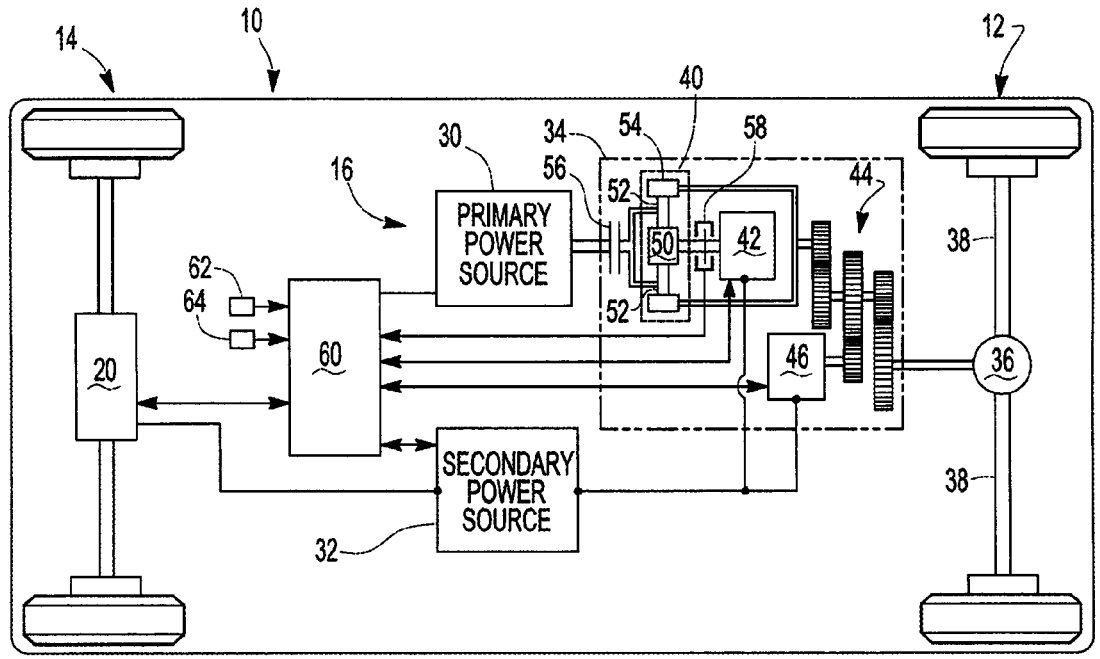
FIG. 1 is a schematic of an exemplary hybrid vehicle.

Referring to FIG. 1, a schematic of a hybrid vehicle 10 is shown. The hybrid vehicle 10 may include a first wheel set 12, a second wheel set 14, and a wheel drive system or drivetrain 16.

The drivetrain 16 may be configured to drive or actuate the first and/or second wheel sets 12, 14. The drivetrain 16 may have any suitable configuration, such as a series drive, split hybrid drive, or dual mode split as is known by those skilled in the art. In the embodiment shown in FIG. 1, a power split drive configuration is shown.

The drivetrain 16 may be configured to drive or provide torque to the first and/or second wheel sets 12,14. In the embodiment shown, the first wheel set 12 is configured to be driven by the drivetrain 16 while the second wheel set 14 is configured to be driven by an electrical machine 20, such as an electric motor. Alternatively, the second wheel set 14 may be provided without an electrical machine 20 in other embodiments of the present invention.

The hybrid vehicle 10 may include any suitable number of power sources. In the embodiment shown in FIG. 1, the hybrid vehicle 10 includes a primary power source 30 and a secondary power source 32.

The primary power source 30 may be any suitable energy generation device, such as an internal combustion engine that may be adapted to combust any suitable type of fuel like gasoline, diesel fuel, or hydrogen.

The secondary power source 32 may be of any suitable type. For example, the secondary power source 32 may be electrical, non-electrical, or combinations thereof. An electrical power source such as a battery, a battery pack having a plurality of electrically interconnected cells, a capacitor, or a fuel cell may be utilized. If a battery is used it may be of any suitable type, such as nickel-metal hydride (Ni—MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. A non-electrical power source may be a device whose energy may be converted to electrical or mechanical energy. For instance, a hydraulic power source or mechanical power source such as a flywheel, spring, engine, or compressed gases may store energy that may be converted to or released as electrical or mechanical energy as needed. For simplicity, the description below will primarily refer to an embodiment of the present invention that incorporates an electrical power source.

The primary and secondary power sources 30,32 may be adapted to provide power to a power transfer system 34 and/or electrical machine 20. The power transfer system 34 is adapted to drive one or more vehicle wheels. In at least one embodiment, the power transfer system 34 may be connected to a differential 36 in any suitable manner, such as with a driveshaft, chain, or other mechanical linkage. The differential 36 may be connected to each wheel of the first wheel set 12 by one or more shafts 38, such as an axle or halfshaft.

The power transfer system 34 may include various mechanical, electrical, and/or electromechanical devices. In the embodiment shown, the power transfer system 34 includes a planetary gear assembly 40, a first electrical machine 42, a power transfer unit 44, and a second electrical machine 46 as primary components.

The planetary gear assembly 40 may have any suitable configuration. In the embodiment shown, the planetary gear assembly 40 includes a sun gear 50, a plurality of planet gears 52, and a ring gear 54.

The primary power source 30 may be selectively coupled to the planetary gear assembly 40 via a clutch 56. The clutch 56 maybe of any suitable type, such as a one way clutch that permits the primary power source 30 to drive the planetary gear assembly 40. If the clutch 56 is engaged, the primary power source 30 may rotate the planet gears 52 of the planetary gear assembly 40. Rotation of the planet gears 52 may then rotate the ring gear 54. The ring gear 54 may be coupled to the power transfer unit 44 that are coupled to the differential 36 for transmitting torque to vehicle drive wheels to propel the hybrid electric vehicle 10. The power transfer unit 44 may include a plurality of gear ratios that may be engaged to provide a desired vehicle response.

The first electrical machine 42, which may be a motor or motor-generator, may be coupled to the sun gear 50 to provide torque to supplement or counteract torque provided by the primary power source 30. A brake 58 may be provided to reduce the speed and/or the transmission or torque from the first electrical machine 42 to the sun gear 50.

The second electrical machine 46 may be powered by the secondary power source 32 and/or the first electrical machine 42. The second electrical machine 46, which may be a motor, may be coupled to the power transfer unit 44 to propel the hybrid electric vehicle 10.

One or more control modules 60 may monitor and control various aspects of the hybrid vehicle 10. For simplicity, a single control module 60 is shown; however, multiple control modules may be provided for monitoring and/or controlling the components, systems, and functions described herein.

The control module 60 may communicate with the primary power source 30, secondary power source 32, and electrical machines 42,46, to monitor and control their operation and performance. The control module 60 may receive signals indicative of engine speed, engine torque, vehicle speed, electrical machine speed, electrical machine torque, and operational state of the secondary power source 32 in a manner known by those skilled in the art. For example, engine speed may be detected by an engine speed sensor (not shown) adapted to detect the rotational speed or rotational velocity of an associated component. Such a speed sensor may be incorporated with the primary power source 30 to detect the rotational speed or velocity of a primary power source output shaft. Alternatively, a speed sensor may be disposed in the drivetrain 16 downstream of the primary power source 30.

The control module 60 may receive input signals from other components or subsystems. For example, the control module 60 may receive a signal indicative of vehicle acceleration that is requested by a driver or by a vehicle system, such as an active or intelligent cruise control system. Such a signal may be provided by or based on a signal from an input device or sensor 62, such as an accelerator pedal sensor or cruise control input device.

The control module 60 may also receive a signal indicative of a vehicle deceleration that is requested by a driver or by a vehicle system, such as an active or intelligent cruise control system. Such a signal may be provided by or based on a signal from an input device or sensor 64, such as a brake pedal sensor or cruise control input device.

Acceleration and deceleration requests may be used to assess whether a "tip-in" event or a "tip-out" event has occurred. A tip-in event may indicate that additional power or vehicle acceleration is demanded. A tip-out event may indicate that less power or vehicle deceleration is demanded. For example, a tip-in event may be indicated by actuation of an accelerator pedal. Similarly, a tip-out event may be indicated by braking of the vehicle, lifting off an accelerator pedal, or combinations thereof.

In a hybrid vehicle, acceleration (tip-in) and deceleration (tip-out) events may lead to a change in the power provided to actuate vehicle wheels. In general, an acceleration request increases power consumption demand and deceleration request reduces power consumption demand. This change in power demand may result in a transient condition or state in which the operational characteristics of at least one power source change to provide an increased or reduced amount of power.

In a hybrid vehicle having an engine, the engine power may be a function of engine speed and engine output torque (e.g., power=torque*speed). During transient conditions, reduced fuel economy may occur if the engine speed and engine torque are not intelligently controlled. Fuel economy shortcomings may be magnified by aggressive driving with more frequent tip-in and/or tip-out events. The present invention may help provide improved fuel economy as compared to existing methodologies by providing an improved method of control.

Figure 2:
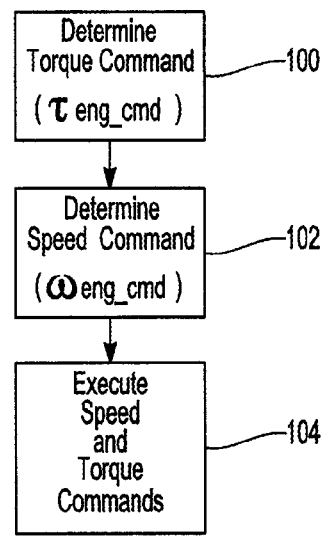
FIG. 2 is a flowchart of a method of controlling operation of the hybrid vehicle.
Figure 3:
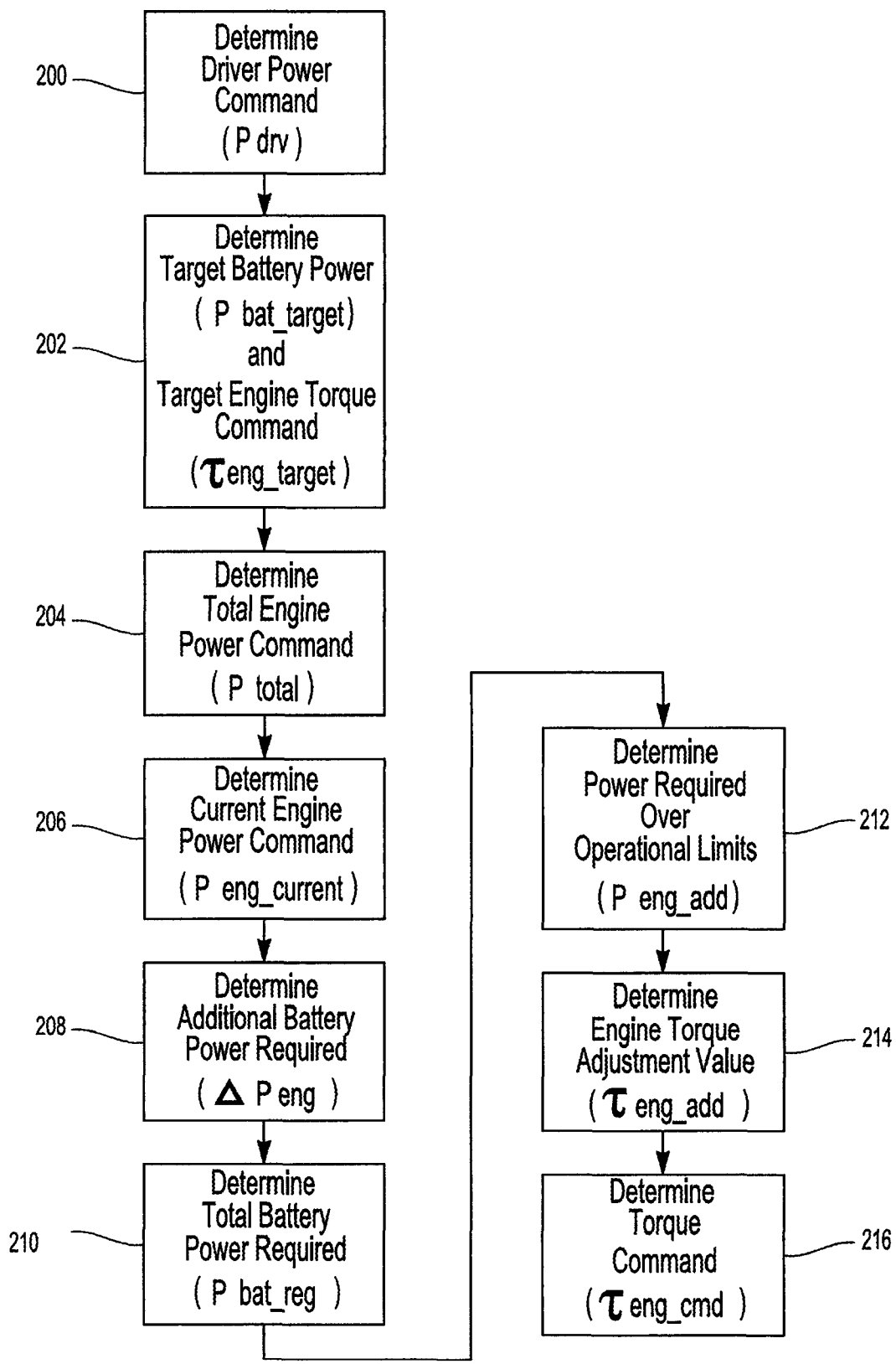
FIG. 3 is a flowchart illustrating a method of determining a torque command.
Figure 4:
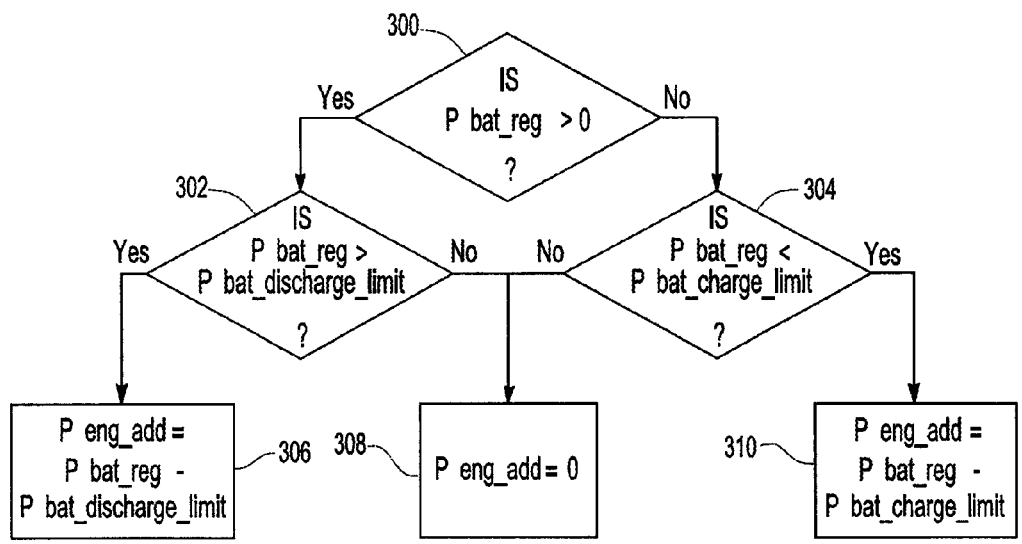
FIG. 4 is a flowchart illustrating a method of determining whether power required from a power source is within one or more operational limits.

Referring to FIG. 2-4, flowcharts illustrating methods of controlling operation of a hybrid vehicle are shown. As will be appreciated by one of ordinary skill in the art, the flowcharts represent control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated.

Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Referring to FIG. 2, a flowchart that summarizes a method of control in accordance with the present invention is shown. The method is described with reference to an embodiment of a hybrid vehicle having an engine as a primary power source and a battery as a secondary power source; however, it is to be understood that other primary and secondary power sources may be employed as described above in various embodiments.

At 100, an engine torque command ($\tau_{eng\_cmd}$) is determined. Details regarding how the engine torque command may be determined are shown in FIG. 3.

At 102, an engine speed command ($\omega_{eng\_cmd}$) is determined. Details regarding how the engine speed command may be determined are discussed below after the discussion of the engine torque command.

At 104, the engine speed command and engine torque commands are executed. Execution may be controlled by the control module 40 in a manner known by those skilled in the art. The execution of the engine speed and engine torque commands may result in more fuel efficient engine operation.

Referring to FIG. 3, determination of the engine torque command ($\tau_{eng\_cmd}$) will now be described in detail.

At 200, a power command ($P_{drv}$) is determined. The power command may be based on commands provided by the driver or a system that can command vehicle acceleration or deceleration, such as an active cruise control system. In at least one embodiment, the power command may be determined as a function of the expression:

$$P_{drv} = (Accel - Decel) * Speed$$

where:
$P_{drv}$ is the power command,
Accel is the acceleration command,
Decel is the deceleration command, and
Speed is vehicle speed.

As an example, the power command may be based on an acceleration request less any deceleration request, both of which may be indicative of torque. In the case of commands provided by a driver, acceleration and deceleration commands may be based on actuation of accelerator and brake pedals, respectively, or similar input devices as previously discussed. Similar or supplemental commands may be provided by an active cruise control system or other system with or without driver input as previously discussed. Vehicle speed may be used to effectively convert the net acceleration or torque request to power.

At 202, a target battery power level ($P_{bat\_target}$) and a target engine torque command ($\tau_{eng\_target}$) are determined. Determination of these target values may be based on is the power command ($P_{drv}$), vehicle speed, and the current engine speed ($\omega_{eng}$) using preprogrammed values in a look-up table or with an algorithm. For example, the power command, vehicle speed, and the current engine speed may be used to reference appropriate target values in a look-up table. Such a look-up table may be populated with target values that are based on vehicle development testing and/or actual or predicted operational characteristics of the vehicle. The target battery power level and/or target engine torque commands may be optimized values in one or more embodiments. Such optimization may be made with respect to fuel consumption.

At 204, a total engine power command ($P_{total}$) is determined. In at least one embodiment, the total engine power command may be determined as a function of the expression:

$$P_{total} = P_{drv} + P_{bat\_target}$$

where:
$P_{total}$ is the total engine power command,
$P_{drv}$ is the power command, and
$P_{bat\_target}$ is the target battery power level.

As discussed in more detail below, a transient condition may exist when the total engine power command or target battery power level or vehicle speed changes and in which the target engine speed may change from a current speed level to a next target engine speed level.

At 206, a current engine power command ($P_{eng\_current}$) is determined. In at least one embodiment, the current engine power command may be determined as a function of the expression:

$$P_{eng\_current} = \tau_{eng\_cmd(n-1)} * \omega_{eng}$$

where:
$P_{eng\_current}$ is the current engine power command,
$\tau_{eng\_cmd(n-1)}$ is the current engine torque command, and
$\omega_{eng}$ is the engine speed.

The current engine power command may be based on the principle that power equals torque time speed. The current engine torque command may be the current or sufficiently recent engine torque command, such as a torque command from a previous iteration (n−1) of the method. The current engine torque command may be initialized at zero or any suitable value to provide a value when no previous iteration exists. Moreover, using the current engine torque command may provide or sufficiently approximate the instantaneous or actual engine torque.

At 208, a "power error" value or an amount of additional battery power required ($\Delta P_{eng}$) during transient operation is determined. In at least one embodiment, the additional battery power required may be determined as a function of the expression:

$$\Delta P_{eng} = P_{total} - P_{eng\_current}$$

where:
$\Delta P_{eng}$ is the additional battery power required,
$P_{total}$ is the total engine power command, and
$P_{eng\_current}$ is the current engine power command.

Thus, the additional battery power required may be indicative of the amount of power that may not be desired to be provided by the engine during transient operating condition and may be at least partially supplemented or provided by the secondary power source. Another way to conceptualize $\Delta P_{eng}$ is as the difference between the requested total engine power command and the current or instant engine power command.

At 210, the total battery power required ($P_{bat\_req}$) is determined. In at least one embodiment, the total battery power required may be determined as a function of the expression:

$$P_{bat\_req} = P_{bat\_target} - \Delta P_{eng}$$

where:
$P_{bat\_req}$ is the total battery power required,
$P_{bat\_target}$ is the target battery power level, and
$\Delta P_{eng}$ is the additional battery power required.

Thus, the total battery power required may ideally be the amount of power the battery would provide without accounting for its operational limits.

At 212, the total battery power required is compared with operational limits. This comparison returns a value, designated $P_{eng\_add}$, that is indicative of the amount of the battery power desired that is outside of operational limits. Details of this comparison are presented below with the discussion of FIG. 4.

At 214, an engine torque adjustment value ($\tau_{eng\_add}$) is determined. In at least one embodiment, the engine torque adjustment value may be determined as a function of the expression:

$$\tau_{eng\_add} = P_{eng\_add}/\omega_{eng}$$

where:

$\tau_{eng\_add}$ is the engine torque adjustment value, $P_{eng}$ add is the amount of battery power desired that is outside of operational limit(s), and $\omega_{eng}$ is the engine speed.

Thus, this step converts the additional amount of engine power desired from a power value to a torque value.

At 216, the engine torque command ($\tau_{eng\_cmd}$) is determined. In at least one embodiment, the engine torque command may be determined as a function of the expression:

$$\tau_{eng\_cmd} = \tau_{eng\_target} + \tau_{eng\_add}$$

where:

$\tau_{eng\_cmd}$ is the engine torque command, $\tau_{eng\_target}$ is the target engine torque command, and $\tau_{eng\_add}$ is the engine torque adjustment value.

Thus, the engine torque command adjusts the target engine torque command from block 202 if the battery or secondary power source is not able to provide the additional power desired. The engine torque command will be the target engine torque command if no adjustment is needed (i.e., if $\tau_{eng\_add}=0$).

Referring to FIG. 4, a method of determining the amount of the battery power desired that is outside of operational limits is shown. More specifically, FIG. 4 is an embodiment of steps that may be associated with block 212.

At 300, the method determines whether the total battery power required ($P_{bat\_req}$) is a positive value. The total battery power required may be a positive value when the battery is discharging. If the total battery power required is positive, then the method continues at block 302. If the total battery power desired is not positive, then the method continues at block 304.

At 302, the method determines if the total battery power required is greater than a discharge limit value ($P_{bat\_discharge\_limit}$). The discharge limit value may be a predetermined value or range that may be indicative of a limit on the amount of power that may be discharged from the battery. The discharge limit value may be based on the physical and operational characteristics of the battery and may be determined by development testing. If the power required exceeds the discharge limit, then the battery alone cannot provide the desired amount of power and additional power is needed from another power source, such as the engine. If the discharge limit is exceeded, then the method continues at block 306. If the discharge limit is not exceeded, then the battery can provide the power desired without supplemental power. Accordingly, the additional amount of engine power ($P_{eng\_add}$) is set equal to zero at block 308.

At 304, the method determines if the total battery power required is greater than a charge limit value ($P_{bat\_charge\_limit}$). The charge limit value may be a predetermined value that is indicative of a limit on the amount of power that may be received by or used to charge the battery. The charge limit value may be based on the physical and operational characteristics of the battery and may be determined by development testing. If the charge limit is not exceeded, then the battery can receive the excess power and no engine power adjustment is made at block 308 (i.e., $P_{eng\_add}$ is set equal to zero). If the power required exceeds the charge limit, then the battery cannot receive the available power and the method continues at block 310.

At 306, the additional amount of engine power required ($P_{eng\_add}$) is set equal to the amount of power that the battery cannot provide. In at least one embodiment, the additional engine power desired may be determined as a function of the expression:

$$P_{eng\_add} = P_{bat\_req} - P_{bat\_discharge\_limit}$$

where:

$P_{eng\_add}$ is the additional engine power required, $P_{bat\_req}$ is the amount of battery power required, and $P_{bat\_discharge\_limit}$ is the limit on the amount of power the battery can discharge.

Thus, the additional engine power required is set equal to the amount of power the battery cannot discharge or provide while operating within its operational limits.

At 310, the additional amount of engine power required ($P_{eng\_add}$) is set equal to the amount of power that the battery cannot receive. In at least one embodiment, the additional engine power desired may be determined as a function of the expression:

$$P_{eng\_add} = P_{bat\_req} - P_{bat\_charge\_limit}$$

where:

$P_{eng\_add}$ is the additional engine power required, $P_{bat\_req}$ is the amount of battery power required, and $P_{bat\_charge\_limit}$ is the limit on the amount of power that can be used to charge the battery.

Referring again to FIG. 1, the engine speed command ($\omega_{eng\_cmd}$) at block 102 will now be discussed. The engine speed command may be determined based on a target battery power level ($P_{bat\_target}$) previously discussed at block 202, a total engine power command ($P_{total}$) previously discussed at block 204, and the vehicle speed using preprogrammed values in a look-up table or with an algorithm. For example, target battery power level, total engine power command, and vehicle speed may be used to reference a corresponding engine speed command value in a look-up table. Such a look-up table may be populated with engine speed command values that are based on vehicle development testing and/or actual or predicted operational characteristics of the vehicle. Moreover, such values may be fully or partially optimized with respect to vehicle attributes.

Figures 5, 6:
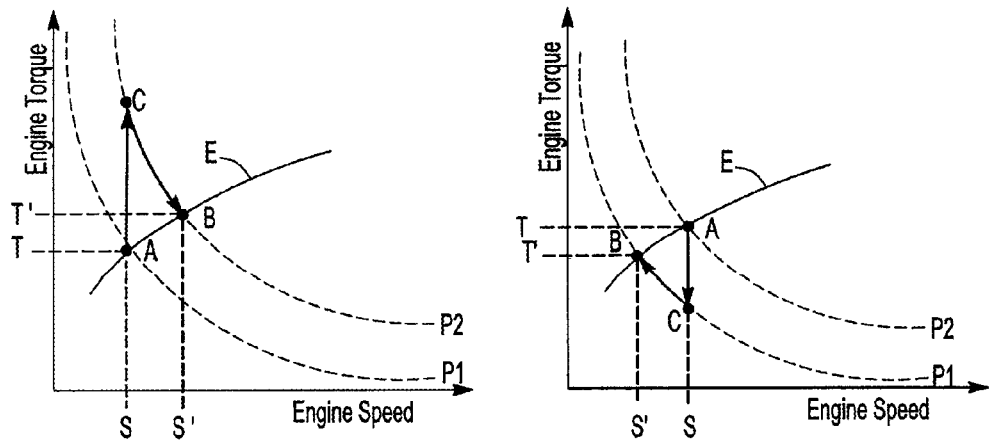
FIGS. 5 and 6 are graphical representations illustrating implementation of the method of control in FIG. 2.

Referring to FIGS. 5 and 6, an exemplary illustration is shown that depicts the operation of a hybrid vehicle. FIG. 5 illustrates operation during an exemplary tip-in event. FIG. 6 illustrates operation during an exemplary tip-out event. In FIGS. 5 and 6, engine torque or engine torque commands are plotted along the vertical axis and engine speed or engine speed commands are plotted along the horizontal axis.

In FIG. 5, two engine power command paths are shown. The first path is designated "P1" represents the current engine power command path. The second path is designated "P2" and represents a desired or target engine power command path.

Initially, the engine is operating at point A on the current engine power command path. Point A corresponds to a current engine speed value (S) and a current engine torque value (T).

Additional power may be desired when a tip-in event occurs. In this example, this additional power is associated with point B on the target engine command path. Point B corresponds to a target engine speed value (S') and a target engine torque value (T'). Thus, to provide the power desired, the engine speed and engine torque must change to move from point A to point B.

Movement from point A to point B may occur in various ways. One way is to instantaneously increase the engine torque command so that the target power path (P2) is attained, which results in moving from point A to point C, and then follow the target engine power path from point C to point B by allowing the engine speed to increase from the current engine speed (S) to a target engine speed (S') and adjusting torque to follow the target engine power path. In other words, the path followed is from A to C to B. Movement from A to C to B constrains engine torque to meet the instant driver requested engine power and may provide sub-optimal engine fuel efficiency. Moreover, the engine torque command may not synchronized with the engine speed command, vehicle speed, or target battery power during transient operation between different power levels. As such, more fuel efficient paths may exist to move from point A to point B.

The method described herein attempts to move from point A to point B along a path is referenced, calculated, or looked up from a multi-dimensional lookup table that may optimize or provide improved fuel efficiency. In FIG. 5, this path is illustrated as engine operation path E. The path may be indexed by driver power command, vehicle speed, and engine speed and may be calculated or referenced as described in block 202 above. For simplicity of illustration, FIGS. 5 and 6 show only one of the three indices, namely engine speed.

Efficient engine operation has a greater influence on fuel economy during transient conditions than variation in battery power usage. Accordingly, the present method attempts to establish and follow a system based or system optimal engine operation path during transient conditions and use battery power to supplement power that is not provided by the engine so long as battery operational limits are not exceeded. As such, more transient battery power variation may occur and the relatively high electrical efficiency is taken advantage of that has less impact on overall fuel efficiency compared to engine torque variation. Thus, engine operation is dynamically adjusted to account for the power error, or difference between the current and target engine power by using battery power when possible to improve or optimize vehicle fuel efficiency.

Referring to FIG. 6, operation during an exemplary tip-out event is shown. Initially, the engine is operating at point A on engine power command path (P2). When a tip-out event occurs, less power is desired. In this example, this reduced power is associated with point B on a target engine power command path (P1). Thus, to provide the power desired, the engine speed and engine torque must change to move from point A to point B. One path is to instantaneously decrease the engine torque to move from point A to point C, and then follow target engine power command path P1 from point C to point B. Movement from A to C to B may provide reduced or sub-optimal fuel efficiency as engine torque is not synchronized with the engine speed, vehicle speed, and target battery power during transient operation between different power levels (i.e., from P2 to P1). As such, more fuel efficient paths may exist to move from point A to point B. The method described herein moves from point A to point B along a four dimensional surface or path, represented by engine operation path E similar to that previously described to optimize or provides improved vehicle fuel efficiency.

While the best mode for carrying out the invention has been described in detail, those familiar with the art to which this invention relates will recognize various alternative designs and embodiments for practicing the invention as defined by the following claims.

What is claimed:

1. A method of controlling operation of a hybrid vehicle having an engine and a secondary power source, the method comprising:
    determining an engine torque command based on a request for vehicle acceleration or deceleration, a target power level of the secondary power source, and a current engine power command;
    determining an engine speed command based on the target power level of the secondary power source, a total engine power command, and vehicle speed; and
    operating the engine based on the engine torque and engine speed commands.

2. The method of claim 1 wherein the target power level of the secondary power source and a target engine torque command are based on the request for vehicle acceleration or deceleration, vehicle speed, and a current engine speed.

3. The method of claim 1 wherein the request for vehicle acceleration is based on signals from an accelerator pedal sensor and a brake pedal sensor.

4. The method of claim 1 wherein the total engine power command is based on the request for vehicle acceleration or deceleration and the target power level of the secondary power source.

5. The method of claim 1 wherein determining the engine torque command further comprises setting the engine torque command equal to a target engine torque command when a total amount of power desired from the secondary power source is within operational limits of the secondary power source.

6. The method of claim 1 wherein determining the engine torque command further comprises adjusting a target engine torque value when a total amount of power desired from the secondary power source is not within operational limits of the secondary power source.

7. A method of controlling operation of a hybrid vehicle having an engine and a secondary power source, the method comprising:
    determining a target power level of the secondary power source and a target engine torque command based on a request for vehicle acceleration or deceleration;
    determining a total engine power command based on the request for vehicle acceleration or deceleration and the target power level of the secondary power source;
    determining a total amount of power desired from the secondary power source based on the target power level of the secondary power source and the difference between the total engine power command and a current engine power command;
    determining whether the total amount of power desired from the secondary power source is within operational limits;
    determining an engine torque command by adjusting the target engine torque command when the total amount of power desired from the secondary power source is not within operational limits;
    determining an engine speed command; and
    executing the engine torque and engine speed commands to control operation of the engine.

8. The method of claim 7 wherein determining the target power level of the secondary power source and the target engine torque command is based on engine speed, vehicle speed, and the request for vehicle acceleration or deceleration.

9. The method of claim 7 wherein the current engine power command is based on engine speed and a current engine torque command.

10. The method of claim 7 wherein determination of the engine speed command is based on the target power level of the secondary power source, the total engine power command, and vehicle speed.

11. The method of claim 7 wherein adjusting the target engine torque command further comprises increasing the target engine torque command to not exceed a discharge limit value when the total amount of power desired from the secondary power source is a positive value and is greater than the discharge limit value.

12. The method of claim 7 wherein adjusting the target engine torque command further comprises reducing the target engine torque command to not exceed a charge limit value when the total amount of power desired from the secondary power source is not a positive value and is less than the charge limit value.

13. The method of claim 7 wherein the engine torque command and engine speed command maintain engine power along an engine operation path that improves vehicle fuel economy.

14. A hybrid vehicle, comprising:
an electrical machine;
primary and secondary power sources capable of supplying power to the electrical machine; and
a control system including at least one controller configured to:
determine a target power level of the secondary power source, a target torque command for the primary power source, and a total power command for the primary power source based at least on part on a driver input;
determine a total amount of power desired from the secondary power source based on the target power level of the secondary power source, the total power command for the primary power source, and a current power command for the primary power source;
adjust the target torque command for the primary power source when the total amount of power desired from the secondary power source is not within operational limits of the secondary power source; and
apply the target torque command to control the torque provided by the primary power source.

15. The vehicle of claim 14 wherein the controller is further configured to adjust the target primary power source torque command by determining a torque adjustment value for the primary power source based at least in part on an operational limit of the secondary power source.

16. The vehicle of claim 14 wherein the controller is further configured to determine a speed command for the primary power source based on the target power level of the secondary power source, the total power command for the primary power source, and vehicle speed.

17. The vehicle of claim 14 wherein the driver input is provided with at least one of an accelerator pedal and a brake pedal.

18. The vehicle of claim 14 wherein the controller is configured to determine the total power command for the primary power source based on the driver input and the target power level of the secondary power source.

19. The vehicle of claim 14 wherein the target torque command for the primary power source is not adjusted when the total amount of power desired from the secondary power source is within operational limits.

20. The vehicle of claim 14 wherein the controller is further configured to determine a speed command for the primary power source and adjust the target torque command and speed command simultaneously to optimize vehicle fuel efficiency.

* * * * *